United States Patent
Lim

US007200126B2

(10) Patent No.: US 7,200,126 B2
(45) Date of Patent: Apr. 3, 2007

(54) METHOD AND SYSTEM FOR SERVING PACKET DORMANT HANDOFF IN MOBILE COMMUNICATION SYSTEM

(75) Inventor: Byung Keun Lim, Kyoungki-do (KR)

(73) Assignee: LG Electronics Inc., Seoul (KR)

( * ) Notice: Subject to any disclaimer, the term of this patent is extended or adjusted under 35 U.S.C. 154(b) by 856 days.

(21) Appl. No.: 09/987,097

(22) Filed: Nov. 13, 2001

(65) Prior Publication Data
US 2002/0057658 A1 May 16, 2002

(30) Foreign Application Priority Data
Nov. 11, 2000 (KR) ............................... 2000-67014

(51) Int. Cl.
H04Q 7/00 (2006.01)
H04Q 7/20 (2006.01)
(52) U.S. Cl. ...................... 370/331; 455/436
(58) Field of Classification Search ................ 370/331; 455/436–442
See application file for complete search history.

(56) References Cited
U.S. PATENT DOCUMENTS 5,594,943 A * 1/1997 Balachandran .............. 455/436
6,081,715 A * 6/2000 La Porta et al. ............ 455/445
6,519,235 B1 * 2/2003 Kim et al. ................... 370/331
6,570,856 B1 * 5/2003 Freeburg et al. ......... 370/310.1
6,766,173 B1 * 7/2004 Chun et al. .................. 455/450
6,834,050 B1 * 12/2004 Madour et al. ............. 370/392
6,912,214 B2 * 6/2005 Madour et al. ............. 370/340
2001/0050907 A1 * 12/2001 Madour et al. ............. 370/329
2002/0021681 A1 * 2/2002 Madour ....................... 370/331
2002/0046277 A1 * 4/2002 Barna et al. ................. 709/224

OTHER PUBLICATIONS

Madour Lila et al (U.S. Appl. No. 60/195,378), Apr. 7, 2000.*
Madour Lila (U.S. Appl. No. 60/226,486), Aug. 18, 2000.*
Barna et al (U.S. Appl. No. 60/226,408), Aug. 18, 2000.*

* cited by examiner

Primary Examiner—Seema S. Rao
Assistant Examiner—Hong Sol Cho
(74) Attorney, Agent, or Firm—Ked & Associates, LLP

(57) ABSTRACT

A method for serving a packet dormant handoff is disclosed, including determining with a mobile switching center whether a mobile station performs a dormant handoff into an area of a destination base station controller/packet controller function (BSC/PCF) and providing information of the dormant handoff from the mobile switching center to an original BSC/PCF, when the mobile station performs the dormant handoff.

19 Claims, 3 Drawing Sheets

METHOD AND SYSTEM FOR SERVING PACKET DORMANT HANDOFF IN MOBILE COMMUNICATION SYSTEM

BACKGROUND OF THE INVENTION

1. Field of the Invention

The present invention relates to a method for serving a handoff in a mobile communication system and, more particularly, to a method for serving a packet dormant handoff in a mobile communication system.

2. Background of the Related Art

FIG. 1 illustrates a configuration of a mobile communication system that serves a packet data communication according to a related art and the present invention. The mobile communication system includes a mobile station (MS) 101; a base transceiver station (BTS) 102 connected with the mobile station 101 by a radio link; a base station controller/packet control function (BSC/PCF) 103 connected with the base transceiver station (BTS) 102; a mobile switching center/visitor location register (MSC/VLR) 104 connected with the BSC/PCF 103; and a home location register (HLR) 105 connected with MSC/VLR 104 to communicate with other communication networks 106, such as a PSTN, PCS, and public land mobile network PLMN.BSC/PCF 103 is connected to an intranet 108 through PDSN 107 and then connected to Internet 109.

In the mobile communication system constructed as above, if the mobile station 101 requires CDMA 2000 packet data service, BSC/PCF 103 decides a destination of the PDSN 107 for transmitting the packet data. At this time, the radio traffic channel and radio link protocol are established in the radio interval between the mobile station 101 and the base station controller. Also, an A8 traffic link for transferring point-to-point protocol (PPP) link data between the mobile station 101 and the PDSN 107 is established between the base station controller and the packet control function. An A10 radio-packet link for transferring the PPP link data between the mobile station 101 and the PDSN 107 is established between the packet control function and the PDSN 107. Here, the A8 interface carries user traffic between the base transceiver station and the packet control function, while the A10 interface carries the user traffic between the packet control function and the PDSN 107.

At this time, the connection of the packet data service at the mobile station 101 is achieved as an active state or an inactive state for the packet data service. The packet data service inactive state represents a state in which the mobile station 101 is not served by the packet data service. The mobile station 101 can convert the packet data inactive state to the packet data active state when a packet data service activation, such as a call origination for the packet data by the mobile station's user or an activation according to another manner, is performed. The packet data service active state establishes and maintains the PPP link between the mobile station 101 and the PDSN 107 and between the packet control function and the PDSN 107, as described above.

The packet data service active state is operated with a packet active state or a packet dormant state according to the radio link state. Here, the packet active state maintains the A8 link by occupying the radio traffic channel at the mobile station 101. Additionally, the packet active state maintains the radio link protocol (RLP) and facilitates the communication of packet data. The packet dormant state controls the mobile station 101, at the base station controller, by releasing the radio channel, the A8 link, and the radio traffic channel.

FIG. 2 is a time sequential chart illustrating control procedures (step a1 to step n1) of serving a packet dormant handoff of a related art. First, an origination message is transmitted (step a1) from a mobile station to a target BSC/PCF, in a state in which a data ready to send (DRS) signal is set as "0." The origination message gets the packet data service when a new packet zone identifier arrives. The target BSC/PCF transmits an acknowledge response message to the mobile station (step b1) upon receiving the origination message. The target BSC/PCF prepares a connection management (CM) service requirement message and transmits it to a mobile switching center (step c1). Also, a timer T303 is driven at the same time in step c1.

Next, the mobile switching center sends a request for the assignment of radio resources to the target BSC/PCF, in response to the service requirement message, and a timer T10 is driven (step d1). The target BSC/PCF stops the timer T303 upon receiving the assignment request.

The target BSC/PCF sends a request for A11 registration to a target PDSN (step e1) to support the packet data service. The registration request message includes a mobility event indicator, within the vendor/organization specific extension. At this time, the target BSC/PCF drives a timer, Tregreq, representing a timer registration requirement.

Next, the target PDSN transmits an All registration reply message to the target BSC/PCF (step f1). At this time, the target BSC/PCF stops the timer Tregreq. The A11 interface carries signaling information between the PCF and the PDSN.

The traffic channel and PPP link are established between the target BSC/PCF and the mobile station as result of each above step, thereby registering a mobile IP (MIP) in step g1. And the base station transmits an assignment complete message to the mobile station in step h1. At this time, the mobile switching center stops the timer T10.

At some point, the All registration life timer for the A10 link, in the source PDSN, shall expire. Then, the source PDSN transmits an All registration renewal message to the source BSC/PCF, as the notification of the re-registration and the source PDSN drives a timer, Tregupd (step i1). Next, the source BSC/PCF transmits an A11 registration recognition message to the source PDSN (step j1) and the source PDSN stops the timer, Tregupd.

Since the mobile station 101 handoffs from the source to the target, the source BSC/PCF requires the A11 registration, with lifetime 0, as the notification of the A10 link release, without renewal to the source PDSN to record the related information (step k1). The source PDSN transmits the A11 registration response message, with lifetime 0, to the source BSC/PCF in response to the registration request (step l1). At this time, the source PDSN stores the related information recorded for additional processes before transmitting the A11 registration response message. And the source BSC/PCF terminates the A10 connection for the mobile station and stops the timer Trefreq.

Periodically, when the registration lifetime of the BSC/PCF A11/A10 link registration is expired, the BSC/PCF shall renew the registration by the registration request message. So, the target BSC/PCF transmits the A11 registration request message to the target PDSN to record the related information (step m1). Then, the target PDSN transmits the A11 registration response message to the target BSC/PCF (step n1).

The above steps from i1 to l1 are not aligned with steps m1 and n1, which occur when the lifetime is expired. Steps m1 and n1 are irrelevant to steps i1~l1.

Referring to FIGS. 1 and 2, the mobile switching center does not transfer the information of the dormant handoff to the source BSC/PCF, when the mobile station is moved during the dormant state from an area of the source or old BSC/PCF into an area of the target or new BSC/PCF, in the related art. Hereinafter, the cause will be explained in detail with reference to FIG. 2.

The operation will be explained under the conditions that the mobile station is moved from an area "A" of the first BSC/PCF into an area "C" of the second BSC/PCF.

Packet data serving node 1 (PDSN1) "B" is not a prospective packet data serving node for a handoff connection, when the mobile station has already established a current PPP link with it. But the packet data serving node 2 (PDSN2) "D" is a prospective target when the mobile station is moved from an old area of the first BSC/PCF into a new area of the second BSC/PCF. In this case, the mobile switching center provides the information for performing the dormant handoff to a new target BSC2/PCF2, thereby setting the radio-protocol link between the new target BSC2/PCF2 and the new target PDSN2. Also, the new target PDSN2 resets the PPP link and transmits an FA advertisement to register the MIP registration, since the MIP mobile station is newly visited.

However, it is noted that the mobile switching center does not transfer the dormant handoff information to the source BSC1/PCF1 and the source packet data serving node. Accordingly, the old source PDSN1 can release the radio-protocol link only when it registers an A10 MIP time out, an upper layer PPP link time out, or the MIP registration time out, as shown in step i1 of FIG. 2. Hence, there is a drawback that the radio-protocol link resource of the old source PCF and IP resource of the old source PDSN are wasted until the time out is completed.

SUMMARY OF THE INVENTION

An object of the invention is to solve at least the above problems and/or disadvantages and to provide at least the advantages described hereinafter.

It is another object of the present invention to provide a method for serving a packet dormant handoff in a mobile communication system that can release a radio-packet link of an old source packet control function (PCF) early.

It is a further object of the invention to prevent the waste of IP resources of an old source packet data serving node (PDSN).

To achieve the above objects, there is provided a method for serving a packet dormant handoff in a mobile communication system. The method includes discriminating, at a mobile switching center or a mobility management and call control entity, whether a mobile station performs the dormant handoff into an area of a new BSC/PCF; providing, at the mobile switching center, information of performing the dormant handoff for the mobile station to an old BSC/PCF, when the mobile station performs the dormant handoff on an area of the new BSC/PCF; transferring, at the old BSC/PCF, a registration request message with lifetime 0 to an old packet data serving node; releasing a radio-protocol link by responding for the registration request with lifetime 0 from the old packet data serving node, received and treated the registration request message from the old base station BSC/PCF, to the old BSC/PCF; and completing, at the old BSC/PCF, the packet dormant handoff service for the mobile station by transmitting the location renewal acknowledge message from the BSC/PCF to the mobile switching center.

The objects of the invention may be further achieved in whole or in part by a method of serving a dormant packet handoff, including establishing a second communication link between a mobile station and a target packet data serving node, after the mobile station has moved from a service area of a source base station controller/packet control function (BSC/PCF) to a service area of a target BSC/PCF; communicating a dormant handoff message from a mobile switching center (MSC) to the source BSC/PCF; and terminating a first communication link between the mobile station and a source PDSN in response to the dormant handoff message.

The objects of the invention may be further achieved in whole or in part by a dormant packet handoff system, including a mobile station; a source packet data serving node (PDSN) that communicates with the mobile station, via a source base station controller/packet control function (BSC/PCF), through a first communication link while the mobile station is located within a service area of the source BSC/PCF; a target PDSN that communicates with the mobile station, via a target BSC/PCF, through a second communication link after the mobile station has moved from the service area of the source BSC/PCF to a service area of the target BSC/PCF; a mobile switching center (MSC) that communicates a dormant handoff message to the source BSC/PCF, after the second communication link is established. The dormant handoff message initiates the termination of the first communication link by the source PDSN and the source BSC/PCF.

The present invention provides the advantages of removing the registration information of a corresponding mobile station early from the old BSC/PCF and releasing the radio-packet link of an old source packet control function (PCF) early. Thereby, the invention efficiently uses the limited radio resource. The mobile switching center transfers the state of performing the dormant handoff for the mobile station to the old BSC/PCF, when the CDMA 2000 packet terminal is performing the dormant handoff into the new BSC/PCF.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
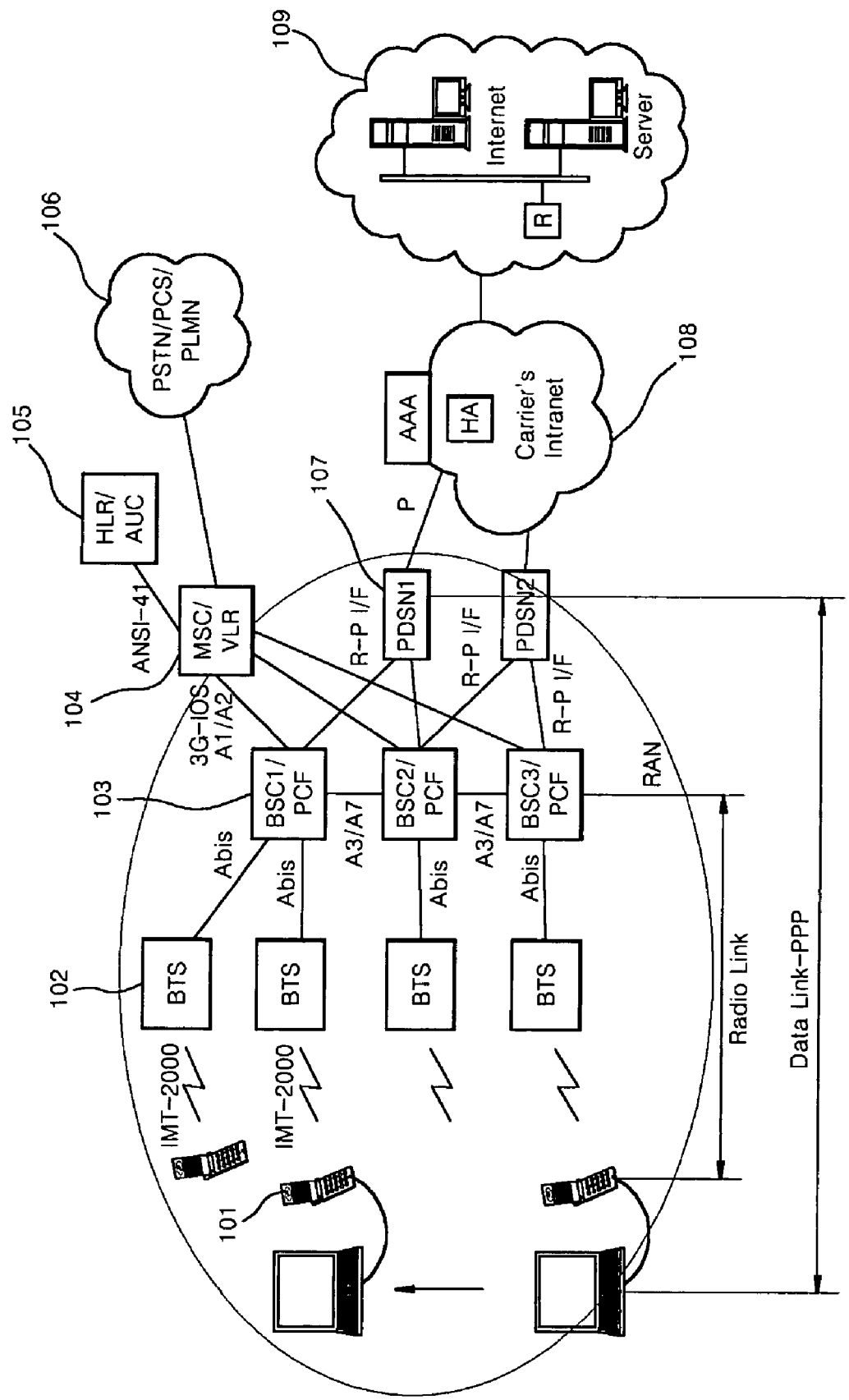
FIG. 1 illustrates a configuration of the mobile communication system to serve a packet data communication, according to a related art and the present invention.
Figure 2:
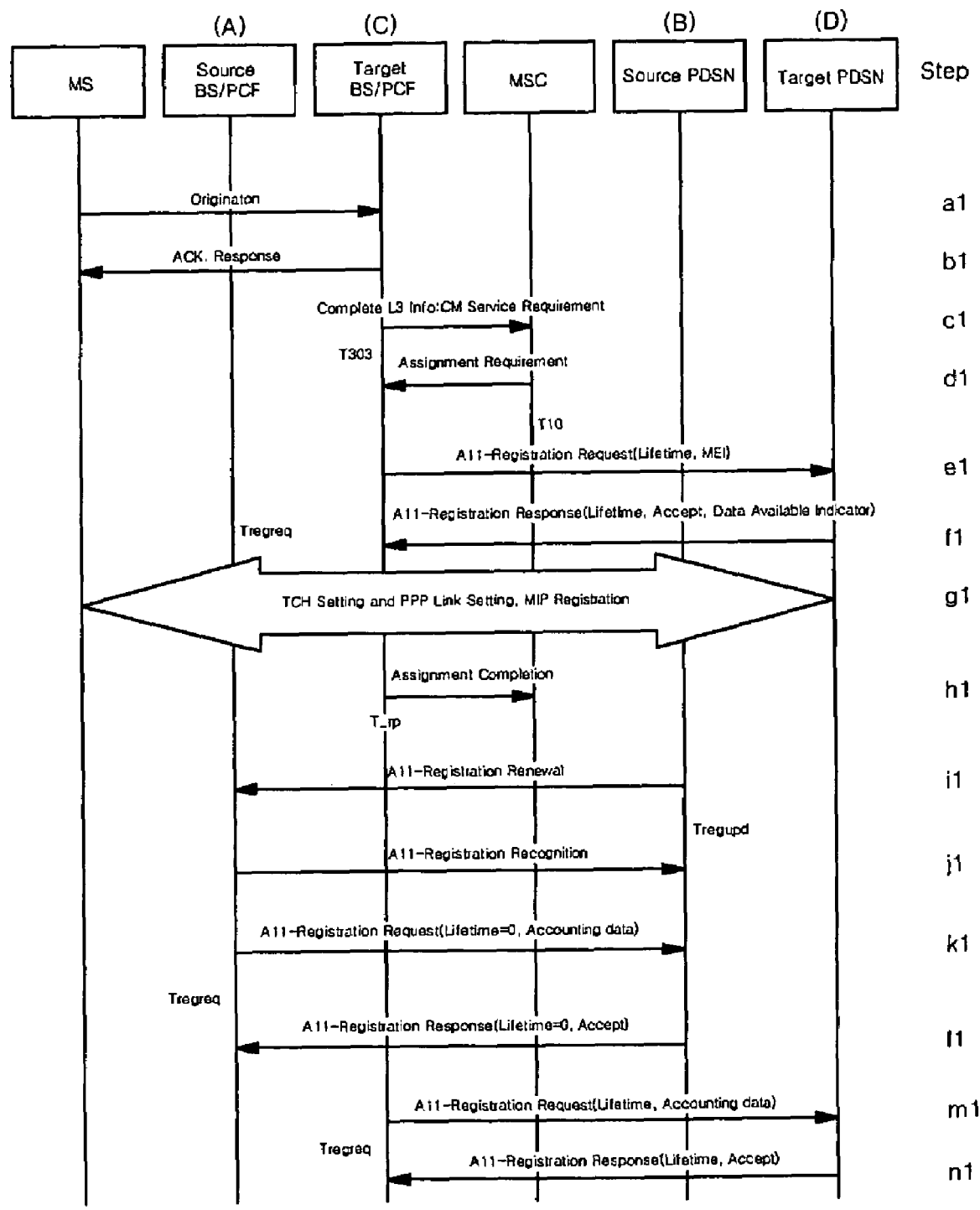
FIG. 2 is a time sequential chart illustrating a method of serving a packet dormant handoff of a related art.
Figure 3:
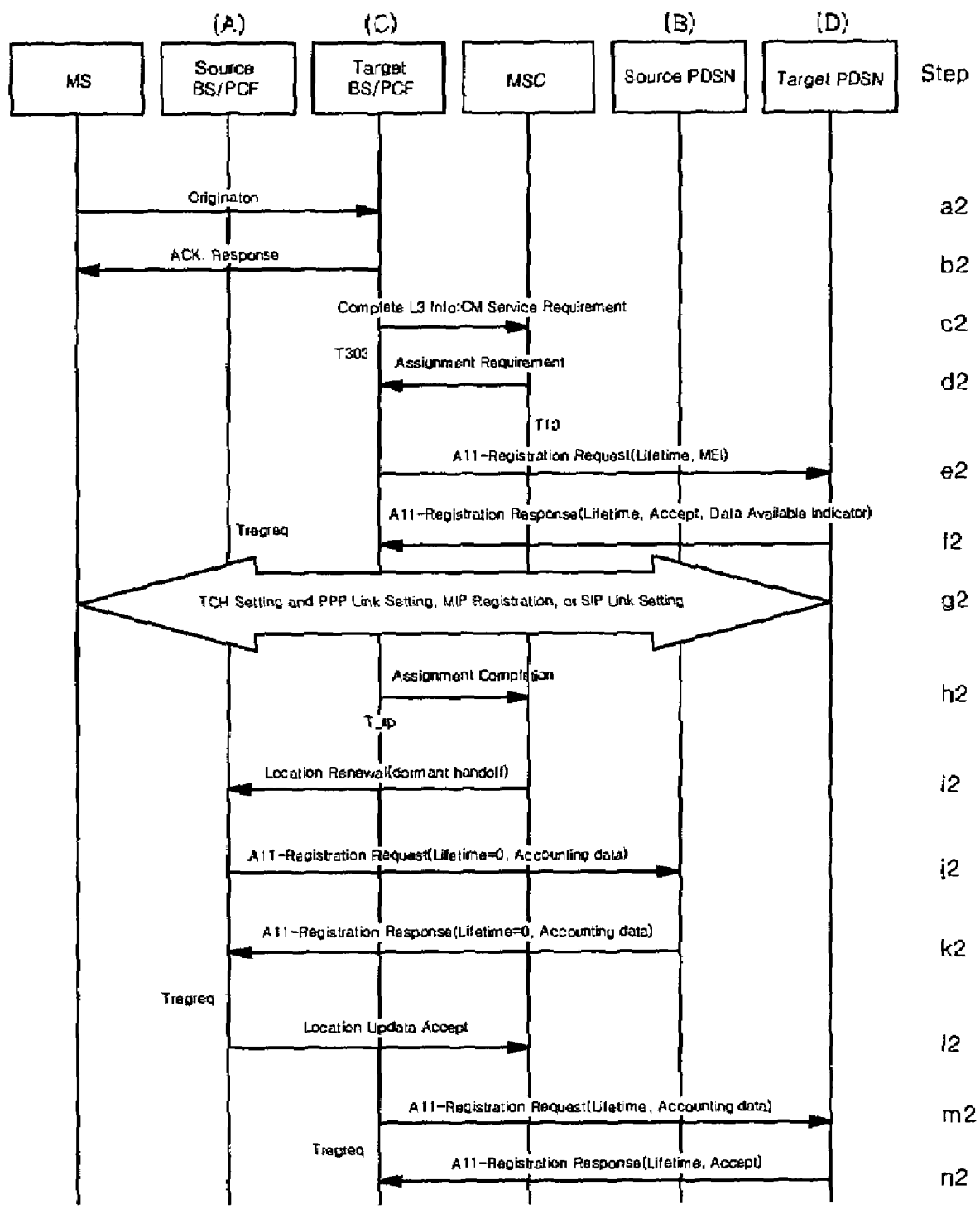
FIG. 3 is a time sequential chart illustrating a method of serving a packet dormant handoff according to the present invention.

FIG. 3 is a time sequential chart illustrating a method of serving a packet dormant handoff according to the present invention. The description of steps a2 to h2 will be omitted, since they are substantially the same as steps a1 to h1 in FIG. 2.

After performing steps a2 to h2, the mobile switching center establishes the radio-packet link with the new packet control function/packet data serving node (PCF/PDSN), when the mobile switching center detects the dormant handoff from the mobile station into the new target BSC/PCF. The mobile switching center transmits a location renewal message to the old source BSC/PCF, when the radio-protocol link is established (step i2). A cause value element of the location renewal information is the packet dormant handoff (step i2).

Next, in response to the i2 message, the source BSC/PCF immediately transfers information to the source PCF that the dormant mobile station has entered into an area of the new BSC/PCF. This information is transferred by a A9-renewal-A8 message (step j2). Then, the source packet control function transmits an A11 registration request message with the lifetime of 0 to the old source PDSN and the old PDSN releases the radio packet link.

At this time, the old PDSN removes a visitor table of the corresponding mobile station and transmits changed information to the authentication authorization and accounting server. Next, the release of the radio packet link is completed by communicating the A11 registration reply message from the source PDSN to the source BSC/PCF (step k2). Also, the source PCF removes the radio packet link table for the mobile station in step k2.

Then, the dormant handoff from the BSC/PCF into the mobile station is completed by transmitting the A9-renewal-A8 Acknowledge reply message from the source PCF to the source BSC and transmitting a location update accept message from the source BSC to the mobile switching center (step l2). The operation of steps m2 an n2 are similar to the operation of steps m1 and n1, respectively, described in reference to FIG. 2.

The technical idea and concept of the present invention may be embodied, even though the mobile station is entered into the area of the old mobile switching center, into a new mobile switching center. The old mobile switching center transmits the location renewal information to the old BSC/PCF, when the mobile station is in a packet dormant handoff state and is performing the dormant handoff into the new mobile switching center. Additionally, the old mobile switching center receives the registration renewal information from an American National Standards Institute (ANSI)-41 message that is a standard of the roaming service object of the mobile station. Thereby, the radio packet link is released early. At this time, the dormant handoff between the mobile switching centers can be allowed, since the information for the serving PCF is stored into the MSC/VLR, described above. The above reference is incorporated herein for the appropriate teaching.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for serving a packet dormant handoff, comprising:
   determining with a mobile switching center whether a mobile station performs a dormant handoff into an area of a destination base station controller/packet controller function (BSC/PCF), the BSC/PCF including a base station controller (BSC) and a packet controller having a packet control function (PCF); and
   providing at least a location renewal message regarding the dormant handoff, the location renewal message being provided from the mobile switching center to an original BSC/PCF when the mobile station performs the dormant handoff, wherein an original packet data serving node (PDSN) withholds communication of a registration renewal message to the original BSC/PCF during a period beginning after the original BSC/PCF receives the location renewal message and ending when a communication link between the mobile station and the original PDSN is terminated.

2. The method of claim 1, wherein the location renewal message regarding the dormant handoff is provided after setting a radio packet link with the destination BSC/PCF and a destination packet data sewing node.

3. The method of claim 1, wherein a cause value element of the location renewal message is the packet dormant handoff.

4. The method of claim 1, further comprising releasing a radio packet link between the original BSC/PCF and the mobile station by transferring a registration request message from the original BSC/PCF to the original PDSN.

5. The method of claim 4, further comprising:
   removing a visitor table of a corresponding mobile station when the original PDSN receives the registration request message from the original BSC/PCF; and
   transmitting changed data to a corresponding sewer.

6. The method of claim 5, further comprising;
   releasing the radio packet link in response to the registration request message; and
   removing, at the original BSC/PCF, a radio packet link table of the mobile station.

7. The method of claim 6, wherein the packet dormant handoff for the mobile station is completed at the original BSC/PCF by transmitting a location renewal acknowledge message from the original BSC/PCF to the mobile switching center, after transmitting a response to the registration from the original PDSN to the original BSC/PCF.

8. The method of claim 1, further comprising:
   transferring an A9-Update-A8 message to the packet controller of the original BSC/PCF to inform the packet controller of the original BSC/PCF that the mobile station has moved;
   transmitting an A11 registration request message from the packet controller of the original BSC/PCF to an original packet data serving node (PDSN);
   transmitting an A11 registration response message from the original PDSN to the packet controller of the original BSC/PCF; and
   releasing the radio packet link at the original PDSN.

9. A method of performing a dormant packet handoff during a first communication link between a mobile station and a source packet data serving node (PDSN), comprising:
   establishing a second communication link between the mobile station and a target PDSN, after the mobile station has moved from a service area of a source base station controller/packet control function (BSC/PCF) to a service area of a target BSC/PCF, the BSC/PCF including a base station controller (BSC) and a packet controller having a packet control function (PCF);

communicating a location renewal message from a mobile switching center (MSC) to the source BSC/PCF, the location renewal message being regarding a dormant handoff;

terminating the first communication link between the mobile station and the source PDSN, in response to the location renewal message;

communicating from the source BSC/PCF to the source PDSN a registration request message having a lifetime field value set to zero, in response to receiving the location renewal message;

releasing resources supporting the first communication link within the source PDSN, in response to the registration request message;

communicating to the source BSC/PCF a registration response message having a lifetime field value set to zero, after releasing the first communication link; and releasing resources supporting the first communication link within the source BSC/PCF, in response to the registration response message, wherein the zero value in the lifetime field of the regristration request message informs the source PDSN that the first communication link is ready for termination, the zero value in the lifetime field of the registration response message informs the source BSC/PCF that the first communication link is ready for termination, and both the source BSC/PCF and the source PDSN terminate the first communication link without waiting for a registration renewal timer period to expire.

10. The method of claim 9, further comprising communicating from the source BSC/PCF to the MSC an acknowledgment of the location renewal message, after terminating the first communication link.

11. The method of claim 9, wherein the first communication link is terminated without waiting for a registration renewal timer period, an upper layer point-to-point protocol (PPP) timer period, or a radio packet link timer period to expire.

12. The method of claim 9, further comprising communicating from the source BSC/PCF to the MSC an acknowledgment of the location renewal message, after the source BSC/PCF terminates the first communication link.

13. The method of claim 9, further comprising:
transferring an A9-Update-A8 message to the packet controller of the source BSC/PCF to inform the packet controller of the source BSC/PCF that the mobile station has moved;

transmitting an A11 registration request message from the packet controller of the source BSC/PCF to the source PDSN;

transmitting an A11 registration response message from the source PDSN to the packet controller of the source BSC/PCF; and releasing the radio packet link at the source PDSN.

14. A method of performing a dormant packet handoff during a first communication link between a mobile station and a source packet data serving node (PDSN), comprising:
establishing a second communication link between the mobile station and a target PDSN, after the mobile station has moved from a service area of a source base station controller/packet control function (BSC/PCF) to a service area of a target BSC/PCF, the BSC/PCF including a base station controller (BSC) and a packet controller having a packet control function (PCF);

communicating a location renewal message from a mobile switching center (MSC) to the source BSC/PCF, the location renewal message being regarding a dormant handoff;

terminating the first communication link between the mobile station and the source PDSN, in response to the location renewal message; and withholding the communication of a registration renewal message from the source PDSN to the source BSC/PCF, during a period beginning after the source BSC/PCF receives the location renewal message and ending when the first communication link is terminated.

15. A communication system, comprising:
a mobile station;
a source packet data serving node (PDSN) that communicates with the mobile station, via a source base station controller/packet control function (BSC/PCF), through a first communication link, while the mobile station is located within a service area of the source BSC/PCF, the BSC/PCF including a base station controller (BSC) and a packet controller having a packet control function (PCF);

a target PDSN that communicates with the mobile station, via a target BSC/PCF, through a second communication link, after the mobile station has moved from the service area of the source BSC/PCF to a service area of the target BSC/PCF; and a mobile switching center (MSC) that communicates a location renewal message to the source BSC/PCF, after the second communication link is established, the location renewal message being regarding a dormant handoff, wherein the location renewal message initiates the termination of the first communication link by the source PDSN and the source BSC/PCF, the source BSC/PCF communicates to the source PDSN a registration request message having a lifetime field value set to zero, after receiving the location renewal message, the source PDSN releases resources supporting the first communication link, in response to the registration request message, the source PDSN communicates to the source BSC/PCF a registration response message having a lifetime field value set to zero, after receiving the registration request message, the source BSC/PCF releases the first communication link, in response to the registration response message, the zero value in the lifetime field of the registration request message informs the source PDSN that the first communication link is ready for termination, the zero value in the lifetime field of the registration response message informs the source BSC/PCF that the first communication link is ready for termination, and both the source BSC/PCF and the source PDSN terminate the first communication link without waiting for a registration renewal timer period to expire.

16. The system of claim 15, wherein the source BSC/PCF communicates an acknowledgment of the location renewal message to the MSC, after terminating the first communication link.

17. The system of claim 15, wherein the first communication link is terminated without waiting for a registration renewal timer period, an upper layer point-to-point protocol (PPP) timer period, or a radio packet link timer period to expire.

18. The system of claim 15, wherein the source BSC/PCF communicates to the MSC an acknowledgment of the location renewal message, after the source BSC/PCF releases the resources supporting the first communication link.

19. A communication system, comprising:
- a mobile station;
- a source packet data serving node (PDSN) that communicates with the mobile station, via a source base station controller/packet control function (BSC/PCF), through a first communication link, while the mobile station is located within a service area of the source BSC/PCF, the BSC/PCF including a base station controller (BSC) and a packet controller having a packet control function (PCF);
- a target PDSN that communicates with the mobile station, via a target BSC/PCF, through a second communication link, after the mobile station has moved from the service area of the source BSC/PCF to a service area of the target BSC/PCF; and
- a mobile switching center (MSC) that communicates a location renewal message to the source BSC/PCF, after the second communication link is established, the location renewal message being regarding a dormant handoff, wherein the location renewal message initiates the termination of the first communication link by the source PDSN and the source BSC/PCF, and wherein the source PDSN withholds the communication of a registration renewal message to the source BSC/PCF, during a period beginning after the source BSC/PCF receives the location renewal message and ending when the first communication link is terminated.

* * * * *